United States Patent [19]

Koslosky et al.

[11] 4,358,815

[45] Nov. 9, 1982

[54] PANELBOARD FOR BOLT-IN AND PLUG-IN CIRCUIT BREAKERS

[75] Inventors: Howard E. Koslosky, Whitefish Bay; Tustin C. Reetz, Milwaukee, both of Wis.

[73] Assignee: Eaton Corporation, Cleveland, Ohio

[21] Appl. No.: 233,357

[22] Filed: Feb. 11, 1981

Related U.S. Application Data

[63] Continuation of Ser. No. 36,235, May 4, 1979, abandoned.

[51] Int. Cl.³ .............................................. H02B 1/20
[52] U.S. Cl. .................................. 361/355; 339/22 B
[58] Field of Search ............. 339/22 B, 198 N, 198 R; 361/346, 353, 355, 358, 361, 363, 376; 174/68 B, 70 B, 71 B, 72 B

[56] References Cited

U.S. PATENT DOCUMENTS

| | | | |
|---|---|---|---|
| 3,054,934 | 9/1962 | Kemyeres | 339/198 N |
| 3,263,132 | 7/1966 | Bangert, Jr. | 339/198 N |
| 3,356,906 | 12/1967 | Lamb | 361/355 |
| 3,995,103 | 11/1976 | Gehrs | 174/72 B |
| 4,153,318 | 5/1979 | Bishop | 339/198 N |

*Primary Examiner*—Gerald P. Tolin
*Attorney, Agent, or Firm*—R. J. McCloskey; L. G. Vande Zande

[57] ABSTRACT

Rigid flat branch circuit connectors secured to vertical bus bars have spaced pairs of upstanding threaded posts flanked by pairs of upstanding pins to receive the line side connectors of bolt-in or plug-in circuit breakers in any desired combination.

10 Claims, 5 Drawing Figures

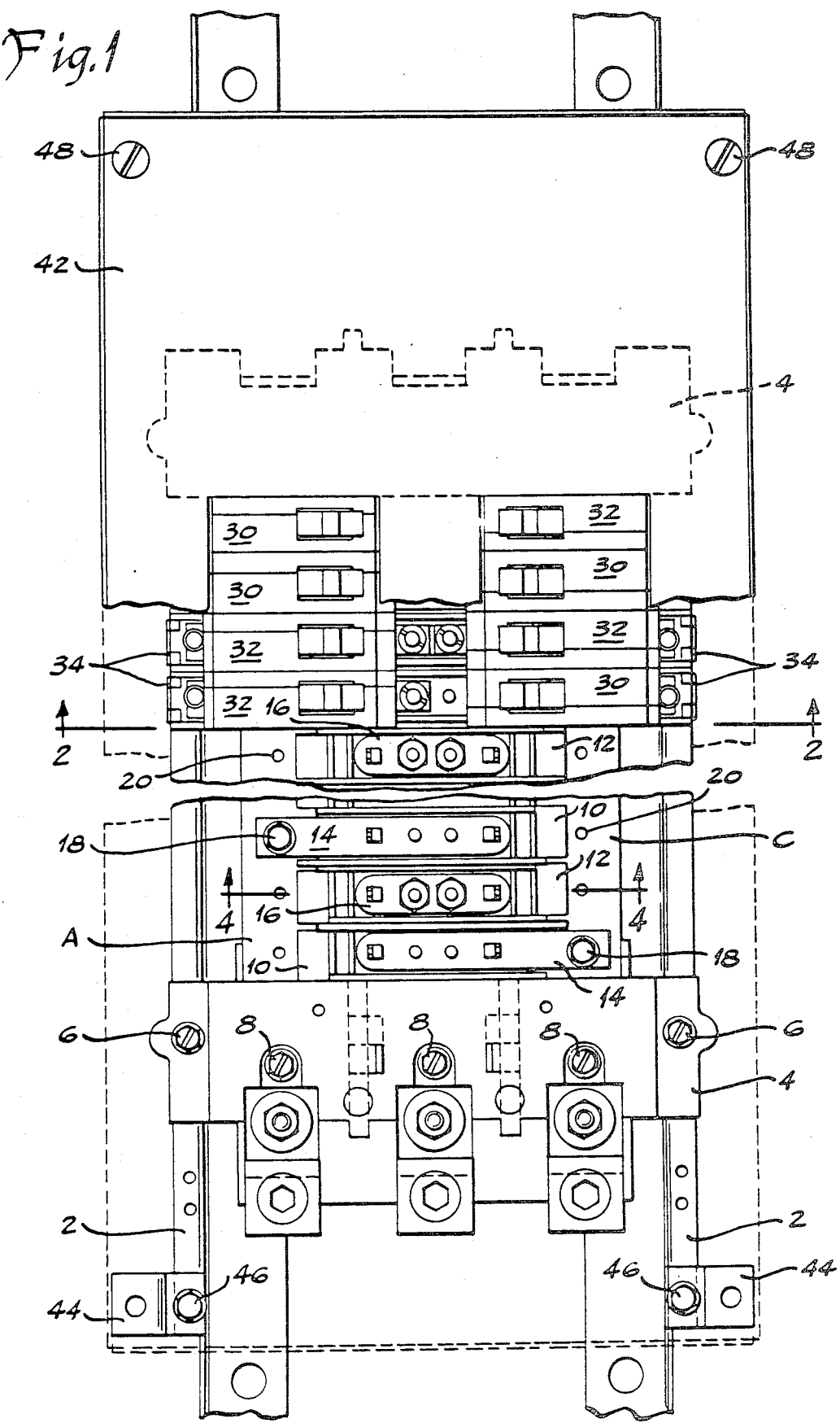

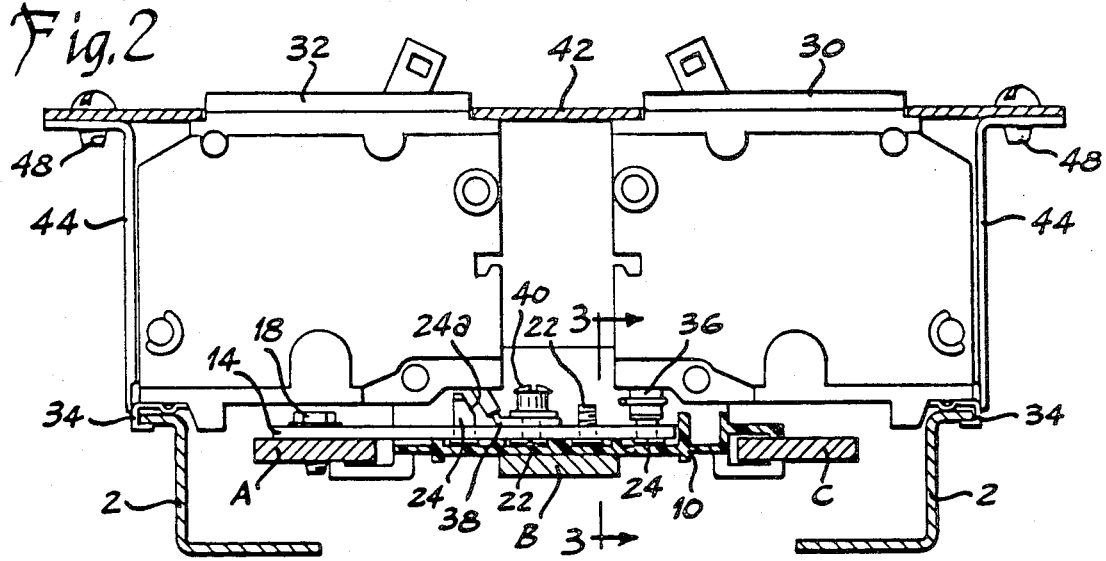
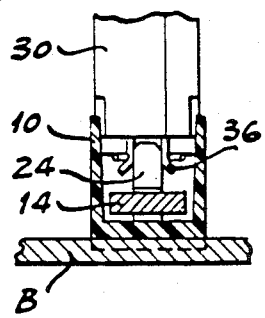
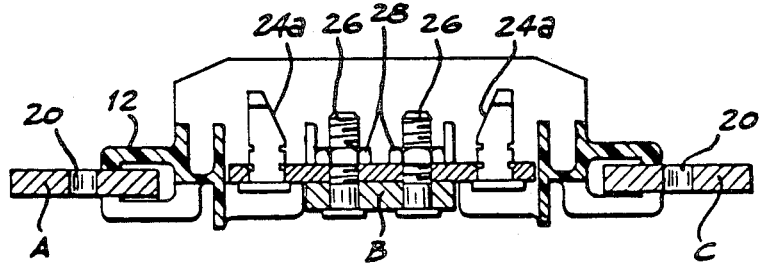
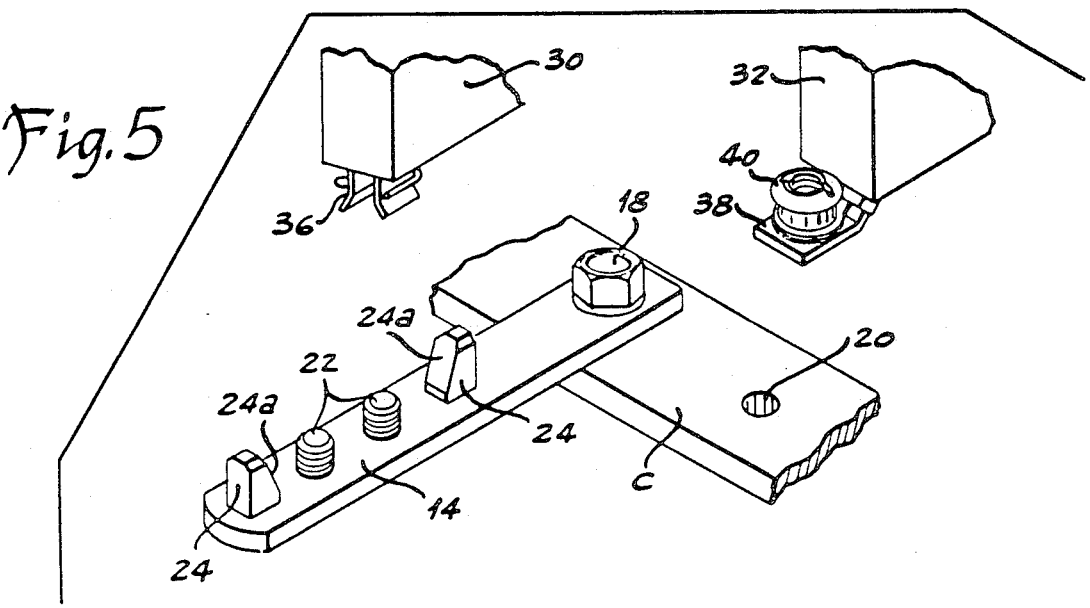

4,358,815

PANELBOARD FOR BOLT-IN AND PLUG-IN CIRCUIT BREAKERS

This is a continuation of application Ser. No. 36,235, filed May 4, 1979, and now abandoned.

BACKGROUND OF THE INVENTION

Panelboards are customarily designed to accept either bolt-in or plug-in circuit breakers, but not both types. Panelboards for bolt-in circuit breakers require frontal access for a tool used in making the line side connection, and therefore, are generally wider than their plug-in counterparts. From a manufacturing and distributing standpoint, it is desirable to standardize on such assemblies to the greatest extent possible to reduce the number of different parts, costs and inventories. It is also desirable to be able to interchange one type of breaker for the other in the field.

Some panelboards are designed to accommodate field interchangeability by changing the branch circuit connector of the panelboard. Only one panelboard design is known which accepts both types of breakers without modification, that being shown in the U.S. Pat. No. 3,356,906 to Raymond Lamb et al. dated Dec. 5, 1967. In that design, branch circuit connectors are formed to extend edgewise across the panelboard while the end thereof which attaches to the bus bar is formed over at right angles to the plane of the connector. The free end of the connector is unsupported and has a tendency to deflect and/or twist under the force required to connect a plug-in circuit breaker thereto. Another disadvantage of the above mentioned design is that the accommodation for the bolt-in connection is a raised central portion which occupies a substantial portion of the passageway between the rows of breakers. That passageway has a significant cooling effect on the panelboard in operation, and it is desirable to reduce the obstructions of that passageway to provide maximum cooling.

SUMMARY OF THE INVENTION

This invention provides a panelboard which will accept bolt-in or plug-in circuit breakers, or combinations thereof. Specifically this invention provides a branch circuit connector for the panelboard which has provisions for accommodating both types of breakers, and is formed to be a flat member of relatively heavy material stock for economic simplicity in manufacturing and rigidity in use. The conector closely overlies the bus bars and accordingly provides a substantially unobstructed passageway between the rows of circuit breakers.

BRIEF DESCRIPTION OF THE DRAWINGS

FIG. 1 is a front view of a panelboard assembly constructed in accordance with this invention;

FIG. 2 is a transverse section view of the panelboard assembly taken along line 2—2 of FIG. 1 drawn to an enlarged scale;

FIG. 3 is a fragmentary sectional view taken along line 3—3 of FIG. 2;

FIG. 4 is a fragmentary section view taken along line 4—4 of FIG. 1 and drawn to an enlarged scale; and FIG. 5 is an isometric view of the branch circuit connector of this invention including fragmentary views showing the line side terminals of a plug-in and bolt-in circuit breaker.

BRIEF DESCRIPTION OF THE PREFERRED EMBODIMENT

Referring primarily to FIGS. 1 and 2 of the drawings, the panelboard assembly of this invention is built upon two vertical support rails 2 which have a Z-shaped cross section over the major portion of their length, but have the forward flange removed at their opposite ends. A pair of transverse insulating base members 4 are secured to the forward flanges of support rails 2 by screws 6 near the upper and lower ends of the support rails to establish transverse spacing of the latter. For three phase, sequenced phase panelboards, three vertical bus bars A, B and C are secured to the back surface of base members 4 by screws 8 which extend through openings in the base members and thread into aligned openings in the respective bus bars. A single phase panelboard is similarly constructed, but the center bus bar is omitted.

A plurality of insulating barrier members 10 and 12 are mounted on the bus bars A, B and C. As best seen in FIGS. 3 and 4, the barriers 10 and 12 are channel-shaped members having forwardly extending upper and lower side walls and front and rear finger portions at the opposite ends to receive the outer bus bars A and C therebetween. Bus bar B is offset rearwardly with respect to the bars A and C and the rear wall of barriers 10 overlies the bus bar B as seen in FIG. 2. The rear wall of barrier members 12 are removed for direct access to bus bar B as can be seen in FIG. 4. The barriers 10 and 12 are stacked upon each other and the lower base member 4 and are transversely positioned by the bust bars A and C.

A first branch circuit connector 14 is provided for the outer bars A and C and a second branch circuit connection 16 is provided for center bus bar B. Connector 14 is an elongated flat finger formed of relatively thick material stock to afford rigidity to the connector without requiring formation of various strengthening ribs or the like. The connector 14 is provided with a clearance hole adjacent one end through which a threadcutting screw 18 passes to take into an aligned hole 20 in the respective bus bar to secure the connector to the bus bar.

A pair of threaded posts 22 having flat, headed portions at one end are inserted within holes in connector 14 from the rear surface thereof. Posts 22 are secured to the connector 14 by virtue of an interference fit between the hole and lower shank of the post. When assembled to the connector 14, the posts 22 project forwardly of the connector and are longitudinally spaced therealong near one end thereof.

Connector 14 also is provided with a pair of rectangular holes, one on either side of the pair of posts 22. These holes receive headed rectangular pins 24 from the rear of the connectors which are staked at the front surface of the connector to secure them to the latter. When assembled, the pins 24 flank the pair of posts 22 longitudinally along the connector. For reasons to be described hereinafter, the pins 24 have outwardly beveled interior surfaces 24a.

Connectors 16 have a pair of pins 24 mounted thereto in the same manner as connectors 14, and at the same spaced location. Between pins 24, connectors 16 are provided with a pair of clearance holes for receiving the forwardly extending threaded shanks of a pair of posts 26. The latter are longer than posts 22, but are otherwise identical thereto, and are secured within holes provided in the bus bar B by an interference fit. Connectors 16 are placed over the threaded posts 26 and are secured to the bus bar B by nuts 28 which take onto the posts 26. A portion of the posts 26 project forwardly of the nuts 28 by an amount equal to the projection of posts 22 beyond the surface of connector 14.

The connectors and insulating barriers are assembled to the bus bars in such a manner as to provide staggered connection to the bus bars A, B and C or to bus bars A and C for single phase constructions. As seen in FIG. 1, starting from the lower base member 4, the first position has the connector 14 connected to bus bar C and projecting to the left. The next position utilizes a connector 16 connected to bus bar B, and the position above that has the connector 14 and barrier 10 reversed to be connected to bus bar A and extend to the right. The position next immediately above would have the connector 14 connected to bus bar C as in the first mentioned position and the pattern continues upward in groups of three for three phase panelboards according to the number of positions desired to be provided on the panelboard.

Plug-in circuit breakers 30 or bolt-in circuit breakers 32 may be attached to the panelboard at any of the positions. Breakers 30 and 32 have hook members 34 at one lower corner, the other lower corner having the line side terminal member. To install a breaker to the panelboard, hook 34 is engaged on the outer edge of the forward flange of a support rail 2 and the breaker is pivoted into position upon the respective branch circuit connector and insulating barrier.

Plug-in breakers 30 each have a spring jaw type line side terminal 36 projecting directly out the rear, or lower portion of the housing. As breaker 30 is pivoted into position, jaw terminal 36 engages the sides of the near side projecting pin 24 of a respective branch circuit connector 14 or 16 to make electrical connection therewith. The mechanical engagement between jaw terminal 36 and pin 24 is made sufficiently firm to provide good electrical connection and to hold the breaker 30 securely in position on the panelboard. Such mechanical connection requires a significant amount of insertion force when making the attachment, and as can be appreciated, if the free end of a branch circuit connector were permitted to deflect under the insertion force, the plug-in connection might not be fully completed.

As hereinbefore mentioned, the branch circuit connectors 14 are made of relatively thick material stock, and as such will withstand the insertion force without undue deflection. Moreover, the rear wall of insulating barriers 10 provide support for the free end of connectors 14 to further resist deflection.

The line side terminal of bolt-in circuit breaker 32 comprises a dog-leg strap 38 which projects angularly out of the rear, or lower surface of the breaker housing in the same area as the jaw 36 of breaker 30, and then extends laterally beyond the side of the breaker housing. Although not shown, the strap 38 has a clearance hole therein for receiving the near side post 22 or 26 when the breaker is pivoted into position. A captivated nut 40 is positioned over the aforementioned clearance hole in strap 38 by a nylon retainer having a loop surrounding the body of nut 40 and a tongue projecting under an insulating sleeve which is disposed over the angular portion of dog-leg strap 38. Using a screwdriver, nut 40 may be tightened upon the respective post 22 or 26 to clamp the strap 38 into good electrical engagement with the surface of connector 14 or nut 28, respectively.

As best seen in FIG. 2, the beveled inner edge 24a of connector pins 24 provides clearance for the angular portion of dog-leg terminal strap 38. This clearance permits both the plug-in breaker 30 and bolt-in breaker 32 to occupy the same lateral location on the panelboard, thereby providing vertically aligned rows of breakers of either type. Moreover, the aforementioned construction permits the connection of both types of line side terminals to be made at a common, deep plane with respect to the front of the panelboard, thereby leaving maximum space between the opposed circuit breakers open for improved air circulation.

When the breakers 30 and/or 32 are attached to the panelboard and the necessary wiring is completed, a deadfront panel, or cover 42 is attached to the panelboard to overlie the breakers, leaving only the handle portions exposed for operation. For this purpose, four Z-shaped brackets 44 are secured to the outer flanges of support rails 2 at the opposite ends thereof by screws 46 to provide four corner support for the deadfront panel 42. The latter is in turn secured to the brackets 44 by screws 48. Inasmuch as the breakers 30 and 32 both occupy the same lateral location on the panelboard, the same deadfront panel may be used for both plug-in or bolt-in breakers.

From the foregoing it can be seen that a panelboard is provided which accepts both plug-in and bolt-in circuit breakers, locates both versions in the same physical, lateral location and effects the line side connections of the breakers at a common, rearward plane to achieve maximum air passageway space between the breakers for improved cooling of the panelboard. The embodiment disclosed herein is a preferred manner of accomplishing the invention which is susceptible of various modification without departing from the scope of the appended claims.

We claim:

1. In an electrical panelboard including a bus bar and adapted to receive both plug-in and bolt-in circuit breakers, a branch circuit connector comprising:
   a rigid flat strip of conductive material secured at one end to said bus bar and extending transversely from said bus bar in a plane parallel to the flat plane of said bus bar, said strip having a length greater than its width in said plane parallel to the flat plane of said bus bar and extending from said bus bar in its lengthwise dimension;
   means spaced longitudinally along the lengthwise dimension of said strip for securing the line side terminal of a respective bolt-in circuit breaker; and
   raised portions for individually receiving the line side terminal of a respective plug-in circuit breaker, said raised portions being intermediate the lateral edges defining the narrow width of said strip and individually longitudinally spaced along the lengthwise dimension of said strip on longitudinally opposite sides of said means.

2. The combination according to claim 1 wherein said raised portions are each provided with a beveled surface on a respective side thereof adjacent said means, each said surface being beveled outwardly away from said means.

3. The combination according to claim 2 wherein said raised portions comprise upstanding pins.

4. The combination according to claim 3 wherein said upstanding pins are rectangular in cross-section and are secured within substantially rectangular holes in said strip to project perpendicularly from said strip.

5. The combination according to claim 4 wherein the line side terminal of a bolt-in circuit breaker contacts said means and overlies a respective one of said upstanding pins, the beveled surface of said respective one of said upstanding pins being adjacent to and spaced from said line side terminal of said bolt-in circuit breaker.

6. The combination according to claim 5 wherein said means comprise threaded posts secured to said strip to extend perpendicularly thereto.

7. An electrical panelboard comprising, in combination:

a pair of support rails;

a pair of insulating base members secured between said support rails at upper and lower ends thereof to mount said support rails in parallel spaced relation;

a plurality of electrically conductive bus bars mounted to said insulating base members to extend parallel to said support rails;

a plurality of insulating barrier members positioned between outer ones of said bus bars and stacked one upon another between said insulating base members;

a plurality of branch circuit connectors each comprising a rigid flat strip of conductive material and secured at one respective end thereof to an outer one of said bus bars to extend laterally over a respective insulating barrier member toward the other outer one of said bus bars, each said strip disposed in a plane parallel to the flat plane of said bus bars and having in said plane a length greater than its width and extending in its lengthwise dimension over said respective insulating barrier, said strip further having means longitudinally spaced along the lengthwise dimension of said strip for securing the line side terminal of a bolt-in circuit breaker attached to said panelboard and for securing the line side terminal of a second bolt-in circuit breaker attached to said panelboard from the opposite side therof and co-linearly with the first mentioned bolt-in circuit breaker, and a pair of raised portions intermediate the lateral edges defining the narrow dimension of said strip and individually spaced longitudinally along the lengthwise dimension of said strip on longitudinally opposite sides of said means, a respective one of said raised portions individually securing the line side terminal of a plug-in circuit breaker alternatively attached to said panelboard in the same location as one of the aforementioned bolt-in circuit breakers.

8. The combination according to claim 7 wherein said raised portions are each provided with a beveled surface on a respective side thereof adjacent said means, each said surface being beveled outwardly away from said means.

9. The combination according to claim 8 wherein said raised portions comprise upstanding pins which are secured within holes in said strip to project perpendicularly from said strip.

10. The combination according to claim 9 wherein said means comprises a pair of threaded posts secured to said strip to extend perpendicualrly thereto.

* * * * *